Aug. 29, 1961 D. L. WINSLOW 2,998,049
APPARATUS FOR BUILDING AIR SPRING
Filed Jan. 28, 1958 5 Sheets-Sheet 1
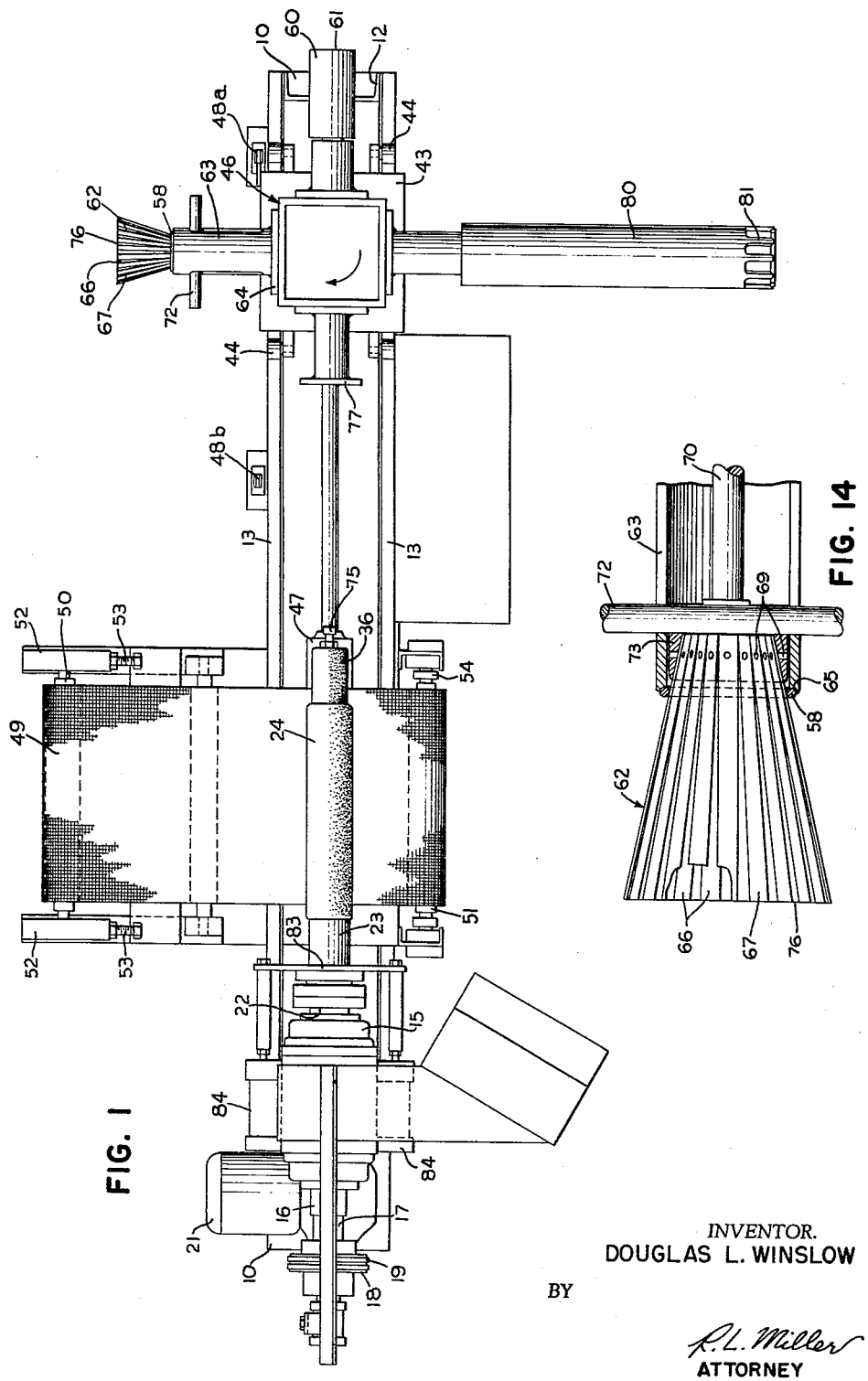
INVENTOR.
DOUGLAS L. WINSLOW
BY
*R. L. Miller*
ATTORNEY Aug. 29, 1961 D. L. WINSLOW 2,998,049
APPARATUS FOR BUILDING AIR SPRING
Filed Jan. 28, 1958 5 Sheets-Sheet 2

INVENTOR.
DOUGLAS L. WINSLOW
BY
*R. L. Miller*
ATTORNEY

Aug. 29, 1961   D. L. WINSLOW   2,998,049
APPARATUS FOR BUILDING AIR SPRING
Filed Jan. 28, 1958   5 Sheets-Sheet 3
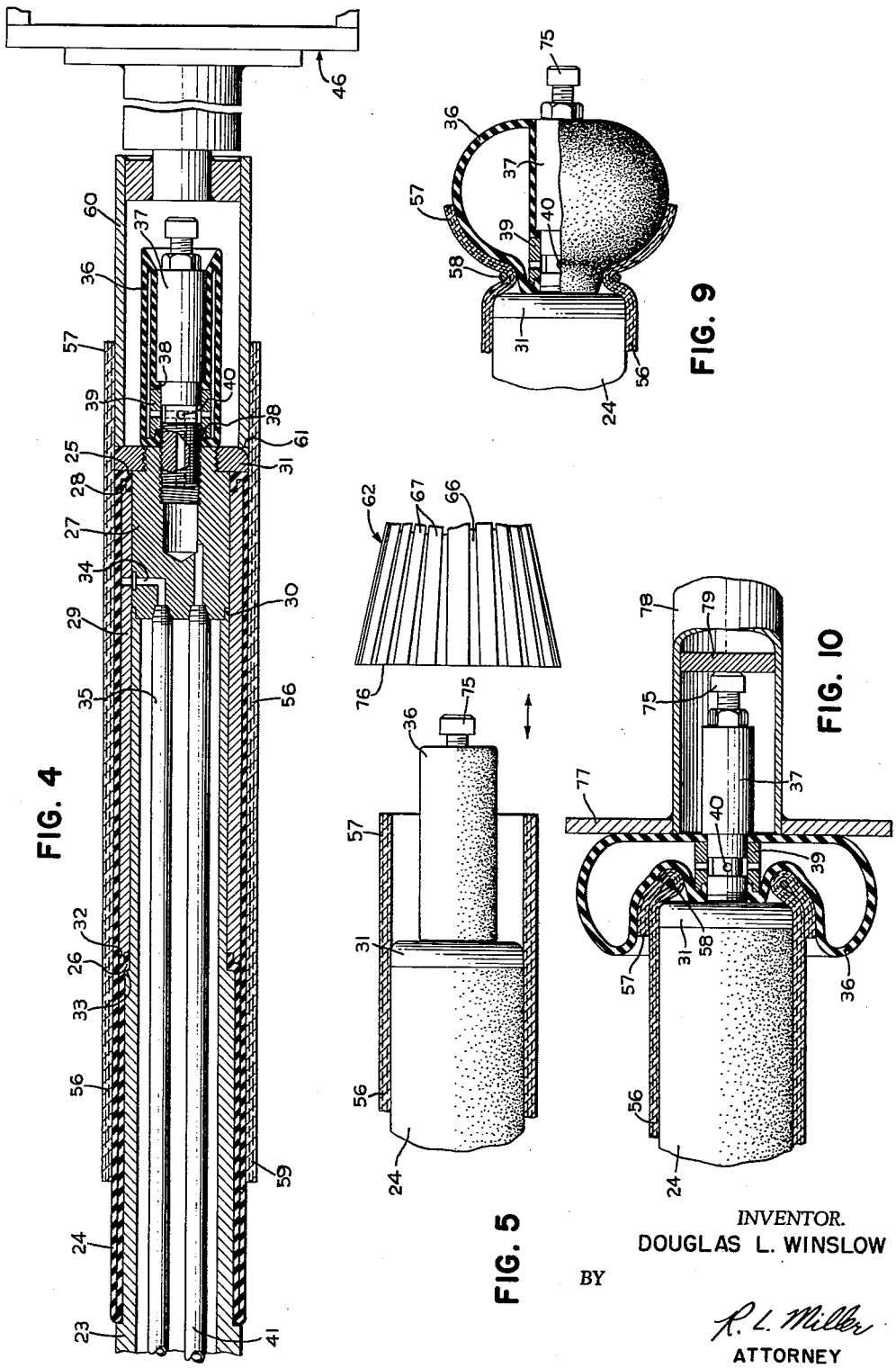
INVENTOR.
DOUGLAS L. WINSLOW
BY
R. L. Miller
ATTORNEY Aug. 29, 1961　　　　D. L. WINSLOW　　　　2,998,049
APPARATUS FOR BUILDING AIR SPRING
Filed Jan. 28, 1958　　　　　　　　　　　5 Sheets-Sheet 5
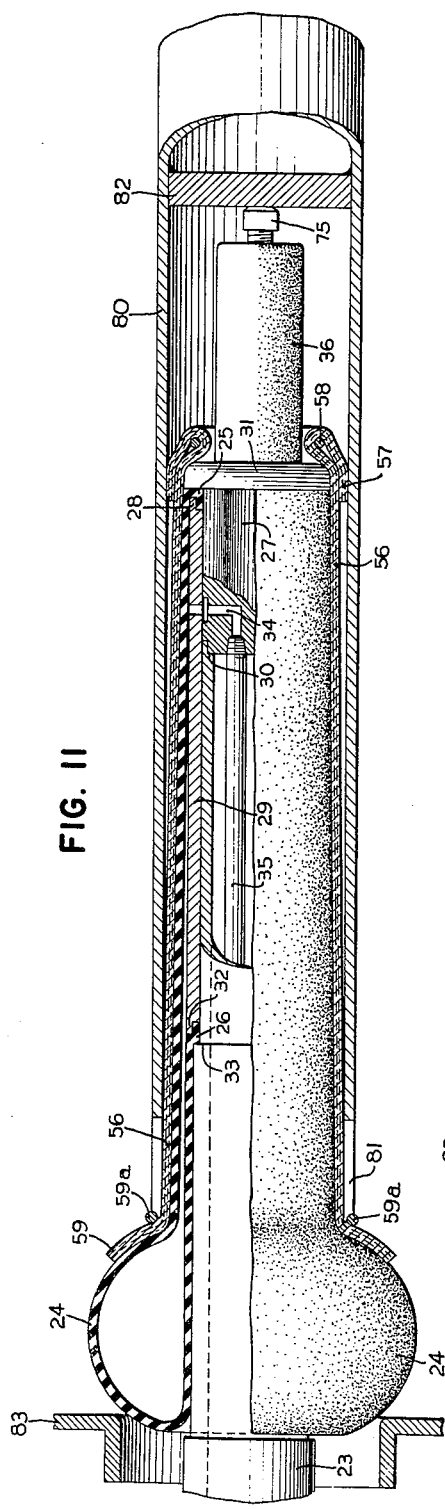
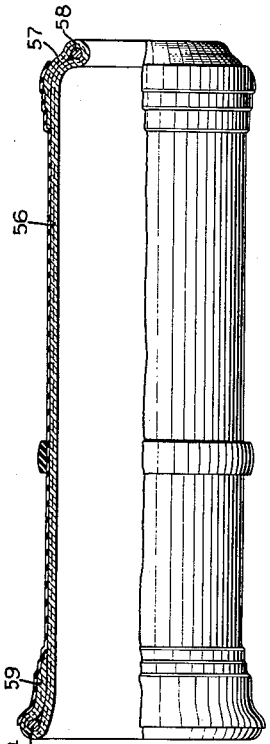
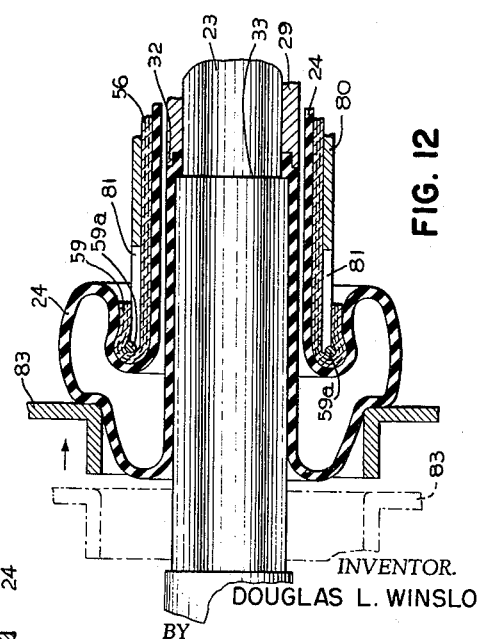
INVENTOR.
DOUGLAS L. WINSLOW
BY
R. L. Miller
ATTORNEY United States Patent Office 2,998,049
Patented Aug. 29, 1961

2,998,049
APPARATUS FOR BUILDING AIR SPRING
Douglas L. Winslow, Cuyahoga Falls, Ohio, assignor to The Goodyear Tire & Rubber Company, Akron, Ohio, a corporation of Ohio
Filed Jan. 28, 1958, Ser. No. 711,654
14 Claims. (Cl. 154—1)

This invention relates to a method of and apparatus for tubular articles laminated of rubber coated cord ply material, more particularly, to improvements in the method of and apparatus for building tubular air springs made of such material and having inextensible bead rings integrally formed at each end thereof.

In building or assembling such air springs, ply material consisting of diagonally disposed parallel cords embedded in rubber is wrapped or placed about the outer surface of a drum or building form, and the circumferential marginal edges of the ply material are folded about the bead rings to retain the latter in place and to secure the edges of the ply material around the bead rings.

The principal object of the invention is to provide a generally improved method of manufacturing air springs and similar products, and an apparatus for carrying out such method which is relatively simple in design and construction and produces air springs rapidly and at minimum cost. The invention aims to provide an air spring building apparatus which is substantially automatic in operation and in which the marginal edge portions of the ply material are folded simultaneously around the entire periphery of the edge to be folded.

A further object of the invention is to provide an air spring building apparatus in which the mechanism for folding the ply material positively holds the marginal edge portion of the plies in a plane parallel to the axis of the building drum.

Another object is to provide an apparatus of the character described in which the bead ring positioning devices and ply turn-up mechanisms are mounted on a common turret laterally of a cantilever supported building drum.

Other objects and advantages residing in certain features of construction and combinations of parts will become apparent from the following detailed description of the apparatus embodying the invention, made with respect to the accompanying drawings in which:

FIG. 1 is a plan view, with parts removed, of the air spring building apparatus of this invention;

FIG. 4 is a longitudinal vertical sectional view, with parts removed, through the building drum of the machine;

FIG. 5 is a partial enlarged detailed view in cross section of the right hand portion of the building drum showing the position of the plies after being wrapped about the drum;

FIG. 9 is a view similar to FIG. 8 in which the ply turn-up mechanism is expanded;

FIG. 10 is a view similar to FIG. 9 in which the ply turn-up mechanism is fully expanded;

FIG. 11 is a view similar to FIG. 4 showing the operation of the ply turn-up mechanism for the large bead end of the air spring;

FIG. 12 is a view similar to FIG. 11 showing the turn-up mechanism stitching the ply endings around the large bead ring;

FIG. 13 is a longitudinal elevational view partly in cross section of the completed air spring;

FIG. 14 is a detailed plan view of the ply turn-down mechanism.

Figure 3:
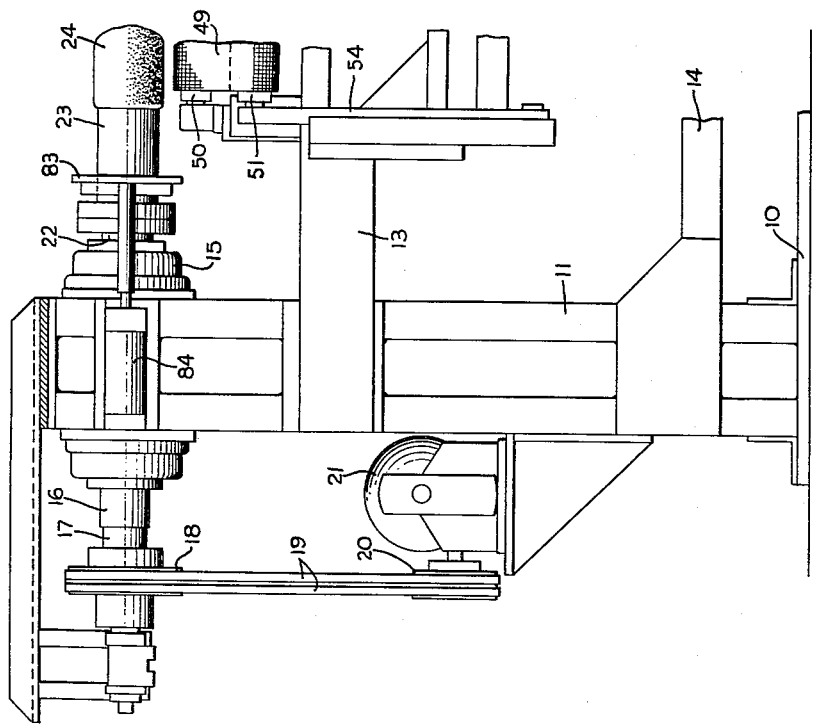
FIG. 3 is a partial front elevational view of the drum support and drive mechanism of the machine shown in FIG. 1.
Figure 2:
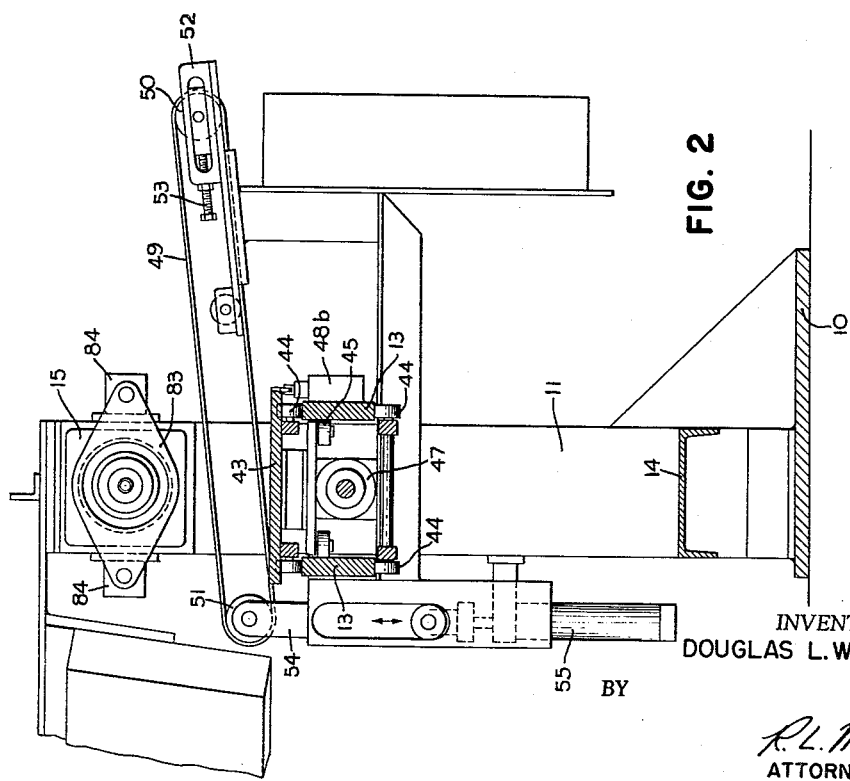
FIG. 2 is a side elevational view, with parts broken away, of the apparatus shown in FIG. 1.

A base 10 preferably extends the full length of the machine from which pedestal members 11 and 12 extend vertically thereof and are connected by suitable horizontal cross frame members 13 and 14. The pedestal 11 supports a main bearing structure 15 in which is journaled a main shaft 16. The end 17 of the shaft 16 is provided with suitable V-belt drive wheels 18 which are driven by V-belts 19, drive wheels 20 and motor 21.

The end 22 of the main shaft 16 supports the building drum 23 in a cantilevered position. Referring to FIG. 4 of the drawings a building drum 23 is provided with an inflatable cord reinforced rubber bag 24 having annular flanges 25 and 26. The flange 25 is secured between the plug member 27 and the flange 28 of the cylindrical member 29. The plug member 27 is secured to the outer end of the drum 23 and is provided with a removable end ring 31 which forms a shoulder for the drum 23 and secures the flange 25 of the bag 24 from axial movement. The opposite flange 26 of the bag 24 is similarly locked between a flange 32 on the member 29 and the shoulder 33 on the drum 23. It is to be noted that the bag 24 extends in overlapping position in a direction to the left of the flange 26 as shown in FIG. 4 and the said overlapped portion of the bag is positioned within a depression in the drum 23. It is seen that the radially outer surface of the bag 24 lies in a cylindrical plane of the same diameter as the removable shoulder ring 31. The plug member 27 is provided with an orifice 34 communicating with the internal surface of the bag 24 and the pipe 35 so that inflationary air may be introduced into the bag.

Referring again to FIG. 4, a ply turn-up bag 36 is positioned axially outwardly of the removable shoulder ring 31. The bag 36 is mounted on a cylindrical support 37 which is axially aligned with and secured to the member 27. The outer surface of the bag 36 has a diameter substantially less than the diameter of the bag 24 and is mounted in overlapped position on the cylindrical support 37 with the flanged ends 38 of the bag locked to the support 37 by the lock ring 39. The support 37 is provided with an orifice 40 communicating with the internal surface of the bag 36 and a pipe 41. Each of the pipes 35 and 41 extend through the main shaft 16 and are connected to a suitable source of compressed air through rotating couplings 42.

The cross frame members 13 support a carriage 43 having suitable rollers 44 rotating on horizontal axes and a set of rollers 45 rotating on vertical axes and bearing respectively against horizontal and vertical surfaces of the cross members 13 so that the carriage 43 may be reciprocated on the cross members in a direction parallel to the axis of the shaft 16. The carriage 43 supports an indexing turret 46 of conventional construction which may be periodically rotated about a vertical axis in a plane containing the axis of the drum 16 and in the direction shown in FIG. 4. The turret is rotated from each position 90° to an adjacent position. It is seen that the turret 46 locates any one of several tools or fixtures in axial alignment relative to the axis of the drum 23. The construction and operation of the tools will be described in detail hereinafter.

A pneumatic cylinder 47 is supported between the cross members 13 to actuate the carriage 43 whereby the carriage is reciprocated relative to the outer end of the building drum. Suitable limit switches 48a and 48b are mounted on the frame members 13 so as to be contacted by the carriage 43 at the extreme inner and outer ends of its length of travel. The closing of either of the limit switches 48a or 48b controls the admission or emission of air from the cylinder 47.

Stitching belt 49 is mounted beneath the building drum 23 and is supported on rollers 50 and 51. The roller 50 is rotatably secured to a bracket 52 having a suitable mechanism such as a set screw 53 for moving the roller 50 relative to the roller 51 to thereby tension the belt 49. The roller 51 is journaled on brackets 54 which are reciprocated in a vertical plane by a pneumatic cylinder and piston 55 so that the upper surface of the endless belt 49 may be brought into engagement with the air springs during the building operation so as to apply uniform stitching pressure thereto.

As previously indicated, air springs and similar products built on the apparatus of this invention are made of a plurality of plies of rubber-coated cord ply material 56, as shown in FIG. 13, with one ply ending 57 turned about a bead ring 58 and the opposite ply ending 59 turned about a bead ring 59A which is of greater diameter than the bead ring 58. During the initial step in the building operation, the apparatus is positioned as shown in FIG. 4. The bags 24 and 36 are deflated and the turret 46 is indexed so that the cylindrical fixture 60 is aligned with the axis of the drum. As the carriage 43 is moved toward the drum 23 the inner end 61 of the fixture 60 butts against the removable member 31 and, since the fixture 60 has a diameter substantially equal to the diameter of the member 31 and the bag 24, a substantially continuous rigidly supported building surface is provided. The operator then successively applies a number of rubber-coated cord plies 56 to the surface of the drum 23 with the marginal edges 57 lying on the outer surface of the fixture 60. After all of the plies have been applied to the drum the cylinder and piston 55 are actuated so as to raise the roller 51 to thereby press the endless belt 49 against the outer surface of the plies with sufficient pressure to stitch the plies together and remove entrapped air from the ply material. The carriage 43 is then retracted to remove the fixture 60 and the turret 46 is indexed 90° so that the ply turn-down mechanism, generally referred to by numeral 62, is axially aligned with the building drum 23 and axially positioned therefrom as shown in FIG. 5.

The ply turn-down member 62 and bead-setter 63 are supported on the turret 46. The cylindrical bead-setter 63 is welded or otherwise secured to the plate 64 and is provided with an arcuate undercut at 65 to frictionally engage the bead ring 58. The ply turn-down member 62 consists of two layers of flexible strips 66 and 67 which are secured at one end to a frusto conical base 68. The strips 66 and 67 are arranged in overlapping relationship as shown in FIG. 14 so that each strip 67 overlaps a pair of adjacent strips 66. The pins 69 extend through a centrally located hole in each strip 67 and through notches located at the edge of the strips 66. Since all of the strips 66 and 67 are supported by the frusto conical member 68 at one end thereof, the strips 66 and 67 project from the frusto conical surface 68 in a frusto conical plane. The strips 66 and 67 are preferably made from spring steel but may be made from any flexible material. The cone shaped member 68 is secured to a shaft which extends through a bore 71 in a plate 64. A pair of arms 72 extend from the shaft 70 and project through elongated slots in the bead-setter 63 so that the shaft 70 and ply turn-down member 62 may be manually reciprocated relative to the bead-setter 63. The collar 73 is positioned concentrically with the conical member 68 to hold the flexible strips 67 in position and to provide a surface on which the turn-down member 62 may slide on the internal surface of the bead-setter 63. The end face 74 of the conical member 68 is engaged by the adjustable stop 75 located on the outer end of the cylinder 37 so that the outer end 76 of the flexible members 66 and 67 may be positioned in a fixed plane normal to the axis of the drum and a predetermined distance from the removable shoulder ring 31.

Figure 6:
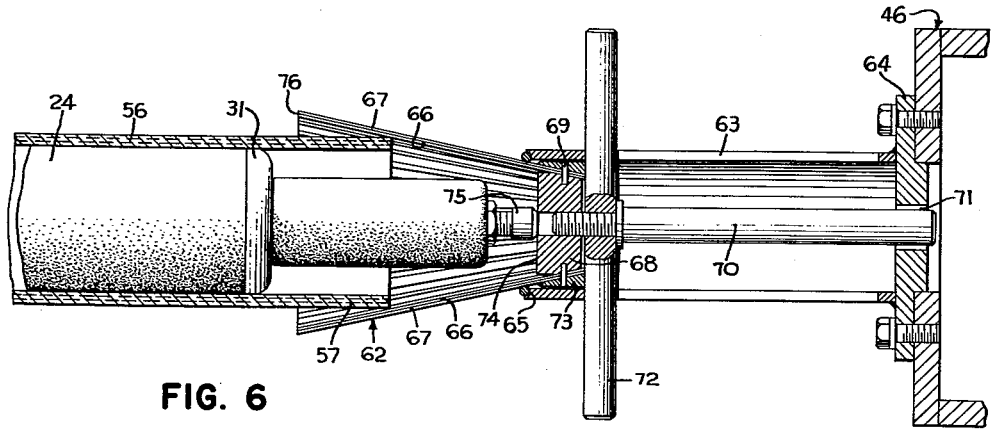
FIG. 6 is a view similar to FIG. 5 showing the position of the ply turn-down mechanism prior to operation of the bead-setter.
Figure 7:
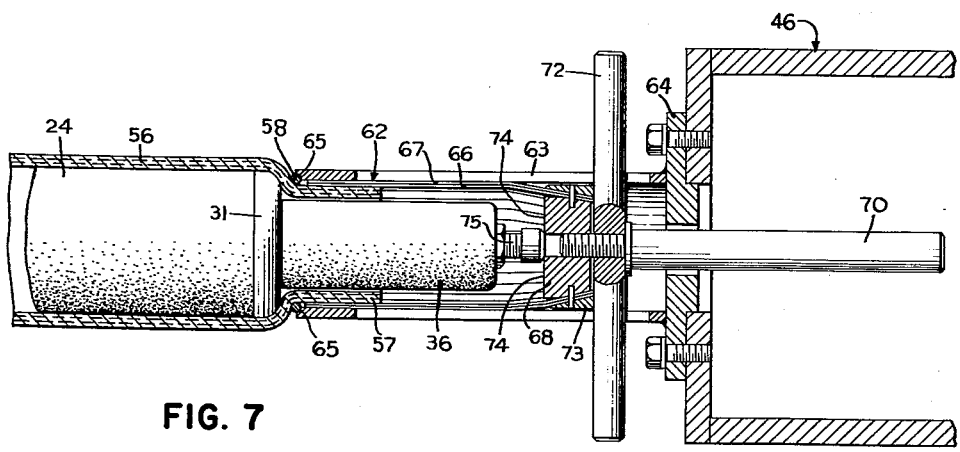
FIG. 7 is a view similar to FIG. 6 showing the ply turn-down mechanism in contracted position.

With the ply turn-down member 62 and bead-setter 63 positioned as shown in FIG. 5, the operator manually contracts the flexible members 66 and 67 radially inwardly and slips the bead ring 58 thereover into position within the arcuate concavity 65 of the bead-setter 63. The cylinder 47 is then actuated to move the carriage 43 toward the drum 23, in the direction of the arrow shown in FIG. 5. This movement is continued until the end face 74 engages the stop 75 and the turn-down member 62 is positioned as shown in FIG. 6. The carriage continues movement toward the drum and the bead-setter 63 moves the bead 58 axially across the length of the flexible members 66 and 67 to gradually and continuously contract said members into the position shown in FIG. 7. As the resilient members 66 and 67 are contracted, the internal surfaces thereof engage the outer surface of the ply endings 57 simultaneously about the complete circumference thereof without pinching or tearing the plies and uniformly turn the ply ends 57 tightly about the shoulder 31 of the drum 23 and against the outer surface of the bag 36. The movement of the turn-down member 62 and bead-setter 63 from the position shown in FIG. 5 to position shown in FIG. 7 is completed almost instantaneously and the movement of the carriage 43 and bead-setter 63 is halted when the bead-setter 63 forces the bead 58 against the turn-down plies 57 and shoulder ring 31 as shown in FIG. 7. It is further seen that the ply endings 57 extend in a plane concentric with and parallel to the axis of the drum 37 and are positively engaged between the outer surface of the bag 36 and the inner surface of the resilient members 67.

Figure 8:
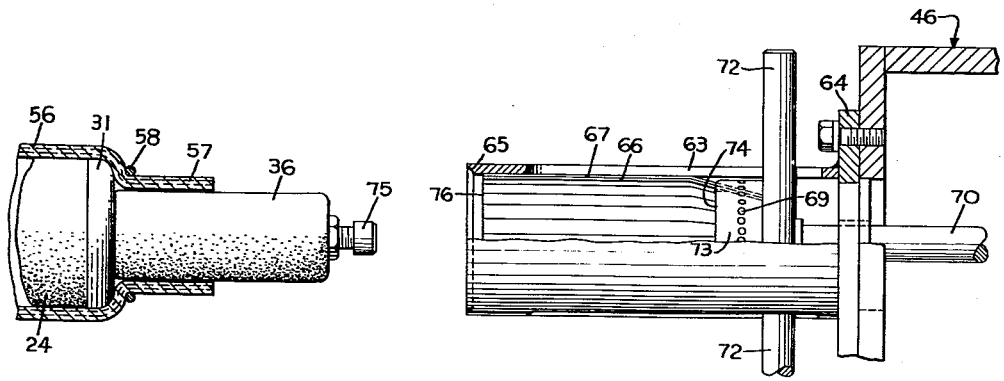
FIG. 8 is a view similar to FIG. 7 in which the turret is shown in retracted position.

The carriage 43 is then moved in a direction away from the drum 23 as shown in FIG. 8 and the bladder 36 is inflated into a shape shown in FIG. 9. Since the bead ring 58 restricts expansion of the ply endings 57 adjacent the shoulder 31, the bag 36 billows or expands outwardly to move the ply ending 57 radially outwardly. While the bag 36 is being so inflated, the turret 46 is indexed so as to positon the pusher plate 77 in axial alignment with the drum 23. Referring to FIG. 10, after the bag 36 has been fully inflated, the carriage 43 is moved toward the drum 23 and the plate 77 engages the bag 36 and rolls the bag radially outwardly and over the bead ring 58 to carry the ply endings 57 about the bead ring 58 to stitch the ply endings 57 to the outermost surface of the air-spring. The plate 77 is secured to a tubular member 78 having a stop plate 79 positioned therein to engage stop 75 and halt the movement of the carriage at the position shown in FIG. 10.

The turret 46 is then indexed to align the second bead-setter 80 with the axis of the drum 23. The bead-setter 80 is provided with a plurality of fingers 81 having arcuate undercut portions to frictionally engage a second and larger bead 59a. The carriage 43 is then moved in a direction toward the drum 23 so that the bead-setter 80 is translated across the complete length of the drum 23 to position the larger bead 59a a predetermined distance from the marginal edge 59 of the plies 56. A stop plate 82 is secured within the tubular bead-setter 80 which engages the adjustable stop 75 on the drum 37. With the bead 59a thus positioned, inflationary air is admitted through the pipe 35 and orifice 34 to inflate the bag 24 secured to the drum 23. Since the bead 59a restricts the expansion of the bag 24, the overlapping portion thereof billows or expands radially outwardly, as shown in FIG. 11 of the drawings, to turn the ply ending 59 radially outwardly.

A pusher plate 83 actuated by cylinders 84 is moved in a direction shown in FIG. 12 toward the bead 59a to roll the overlap portion 24 of the bag around the bead 59a into the position shown in FIG. 12. The pusher plate 83 is then retracted into the position shown in dotted lines in FIG. 12 and while the bag 24 is inflated the bead-setter 80 is retracted by the carriage 43. The marginal edge of the ply endings 59 is then stitched to the outer surface of the air spring 56 manually by suitable hand tools as the drum 23 is rotated.

Those skilled in the art may readily provide suitable controls for effecting operation of the air spring building apparatus and its components in the desired sequence and timed relation. Therefore, no such control elements have been herein illustrated. Switches and timers may be provided where necessary to control the drive motor 21 and to energize solenoid valves, limit switches or the like to admit or vent air under pressure from within the bladders 24 and 36, the actuating cylinders 47, 84 and 55 and the drive for the turret 46. These controls are within the realm of selection by the skilled mechanic and no invention is seen in using any of a variety of forms thereof which may be employed to accomplish the desired functions in the proper sequence and in the desired timed relation.

From the above description, it is apparent that the present invention provides a novel method of building air springs and a unique apparatus for carrying out the method. After the assembled spring carcasses made in accordance with the present invention are withdrawn from the building drum, they are further processed or completed in accordance with conventional methods. These assembled carcasses are expanded to varying shapes within a suitable mold and therein vulcanized. Although the present invention has been described and illustrated in connection with the building of air springs, it is apparent that at least certain features of the apparatus and steps in the method are useful and particularly adapted for building any tubular shaped article made of a plurality of plies of flexible material having bead rings embedded therein such as green tire carcasses and the like.

While certain representative embodiments and details have been shown for the purpose of illustrating the invention, it will be apparent to those skilled in this art that various changes and modifications may be made therein without departing from the spirit or scope of the invention.

I claim:

1. An apparatus for building annular laminated bands of rubber-coated material comprising in combination, an annular form having an end shoulder, a resiliently expanded ply turn-down means at one end of said form which is normally of a diameter greater than that of the form, means movable over said turn-down means for contracting said turn-down means to a diameter less than the form and for releasing the same to permit it to expand and, means for moving said expandable turn-down means axially in either direction whereby it may be moved when expanded into a plane adjacent the end shoulder of the form.

2. An apparatus as claimed in claim 1 in which said turn-down means engages the outer surface of the ply endings simultaneously around substantially the entire circumferential extent thereof and axially from the marginal edge to a plane adjacent the end shoulder of the form, said turn-down means being contractable into substantially cylindrical shape.

3. Apparatus as claimed in claim 2 in which said turn-down means is contracted from its expanded position by means of a cylindrical member slidable over said turn-down means.

4. An apparatus as claimed in claim 3 in which said cylindrical member carries a bead ring over the axial extent of said turn-down means and into engagement with the folded portion of said plies.

5. An apparatus as claimed in claim 1 in which said turn-down means comprises a plurality of pivotably mounted strips defining a frusto conical plane, the larger diameter thereof being larger than said form and the smaller diameter thereof being smaller than said form.

6. An apparatus as claimed in claim 5 in which said strips are made of flexible material.

7. An apparatus as claimed in claim 6 in which said strips are secured at the smaller end thereof to a frusto conical surface.

8. An apparatus as claimed in claim 6 in which said strips are secured to a supporting member and the adjacent strips overlap each other.

9. An apparatus for building an annular laminated band of rubber-coated ply material comprising a building drum having at least one end thereof of fixed diameter, means for turning the edge portion of ply material around the said end of said drum, means for placing a first inextensible circular bead against the turned edge portion of the ply material, means for turning the said ply ending around said first bead, means for positioning a second inextensible bead ring a fixed distance from the fixed diameter end of said drum which extends from said end of the drum longitudinally over substantially the complete axial extent of the drum and means for turning the ply endings outwardly around said second bead ring.

10. An apparatus as claimed in claim 9 in which said means for turning the ply material endings around the drum end of fixed diameter comprises a resiliently expanded annulus which is normally of a diameter greater than that of the drum, and which is contractable to a diameter less than that of the drum for engagement with the radially outer surface of the endings of the ply material and for moving said endings radially inwardly around the drum and simultaneously around the entire circumferential extent thereof.

11. An apparatus as claimed in claim 9 in which the means for turning said marginal edge of the ply material radially outwardly about the bead comprises a substantially cylindrical inflatable expandable member against which the ply endings bear after being folded about the drum end of fixed diameter.

12. An apparatus as claimed in claim 11 having means for inflating said expandable member and means for pushing said member after inflation in an axial direction toward and around the end of the drum of fixed diameter.

13. An apparatus as claimed in claim 9 having a carriage, means for reciprocating said carriage relative to the end of said drum of fixed diameter, a turret means mounted on said carriage rotatable about an axis normal to the axis of said drum and means for securing each of said bead-setting means and ply turn-down means to said turret.

14. An apparatus as claimed in claim 13 having means for periodically rotating said turret about said axis for periodically aligning said bead-setting means and ply turn-down means relative to the axis of said drum.

References Cited in the file of this patent

UNITED STATES PATENTS

| | | |
|---|---|---|
| 1,408,039 | Snyder | Feb. 28, 1922 |
| 1,762,824 | Lehman | June 10, 1930 |
| 2,313,035 | Breth | Mar. 9, 1943 |
| 2,468,286 | Behlert | Apr. 26, 1949 |
| 2,565,071 | Frazier | Aug. 21, 1951 |
| 2,567,064 | Frazier | Sept. 4, 1951 |
| 2,614,952 | Kraft | Oct. 21, 1952 |